L. TANDY.
COMBINED TRUCK AND BAG-HOLDER.
No. 178,886. Patented June 20, 1876.
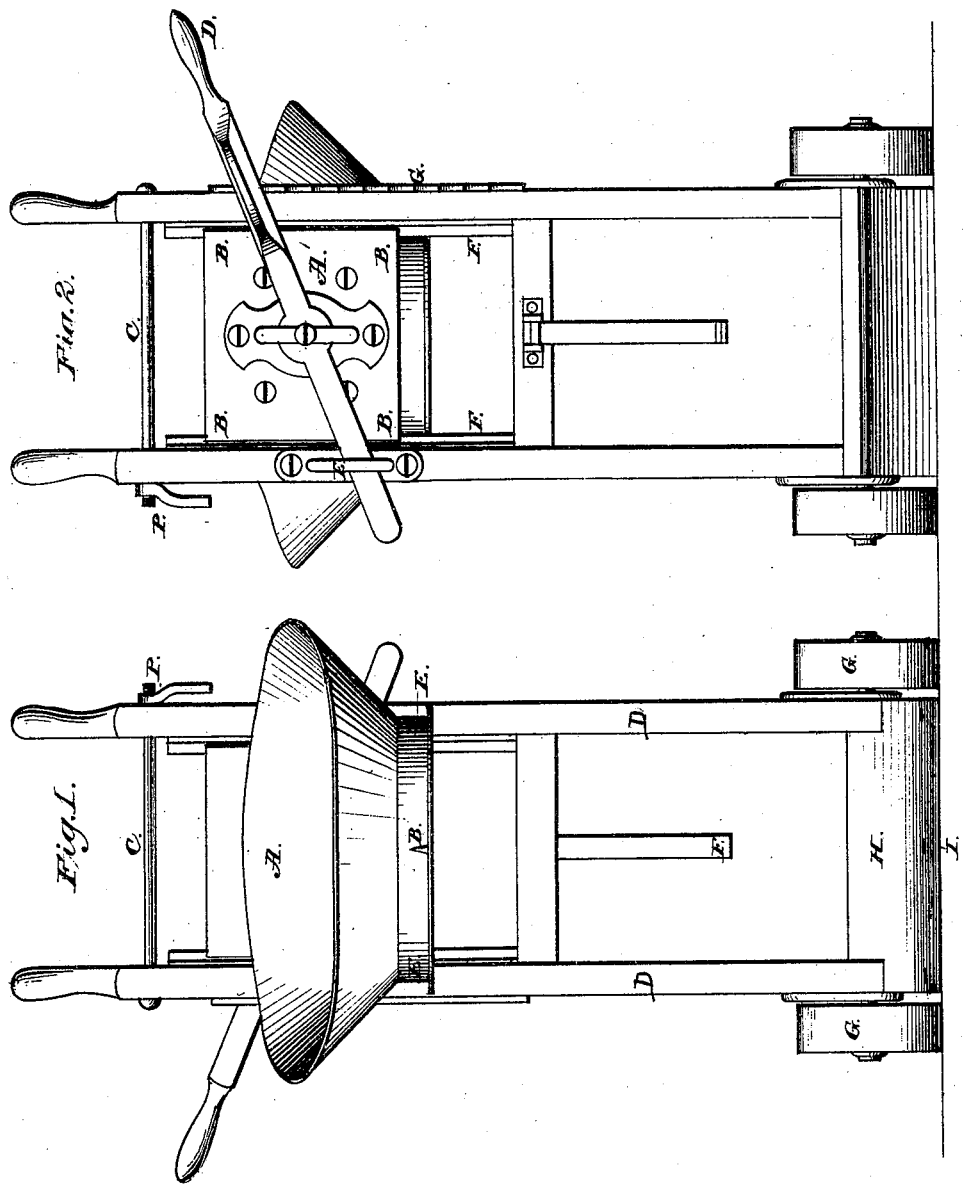
Attest:
J. C. Bouldin
C. R. Foster
Inventor:
Lewis Tandy

UNITED STATES PATENT OFFICE.

LEWIS TANDY, OF CHEROKEE COUNTY, KANSAS.

IMPROVEMENT IN COMBINED TRUCKS AND BAG-HOLDERS.

Specification forming part of Letters Patent No. 178,886, dated June 20, 1876; application filed February 25, 1876.

*To all whom it may concern:*

Be it known that I, LEWIS TANDY, of Cherokee county, Kansas, have invented a Bag-Holder and Truck Combined, of which the following is a specification:

Figure 1 in the accompanying draft represents a front view of my invention—bag-holder and truck combined.

A represents the oblong hopper, to the bottom of which is attached the oblong rim or flange E E, around which passes the mouth of the sack, which is lapped and fastened on the hook B. This hopper is fastened to a square block of wood, A', with two small bolts, as in Fig. 2. D D represent two upright standards or handles, which are mortised into the platform H. The toe of this platform is beveled on the under edge, and is covered with sheet-iron to keep it from wearing out, and is represented by the letter I. The other end of the platform or the head rests on an axle, on each end of which is a wheel, G G. The letter F in Fig. 1 represents a swinging leg.

Fig. 2 in the draft represents a back view of the bag-holder and truck combined.

A represents a square piece of wood, which forms a sash-work, and has two small grooved wheels on each side near the corners of the block. These wheels are marked B B B B, and run on a track or tracks, F F. These tracks are fastened on the standards D D, as in Fig. 1. The letter C represents a rod running through the standards D D near the top. On the end of this rod is a nut, P, which can be turned to tighten or loosen the wheels on the tracks F F, as in Fig. 2. D in Fig. 2 represents a lever, which is fastened near its center with a small screw to the square block A'. One end of the lever plays through the slot E. The letter G represents catches, which hold the lever when the sash-work is raised or lowered for a short or long sack.

I claim—

In a combined truck and bag-holder, the combination of the hopper A with the movable block A', running upon ways F on the inside of the truck-frame, and actuated by the lever D fastened by a screw at its center to the block A', and working at its short end in the slot E.

LEWIS TANDY.

Witnesses:
L. A. VINCENT,
D. E. McKENNEY.